US005615253A

United States Patent [19]
Kocan et al.

[11] Patent Number: 5,615,253
[45] Date of Patent: Mar. 25, 1997

[54] METHOD FOR PROCESSING FORWARDED TELEPHONE CALLS

[75] Inventors: Stephen M. Kocan, Fairfield; Richard L. Mansdoerfer, Jr., Flemington; Russell D. Morgan, Washington; Ronald B. Potter, Somerville, all of N.J.

[73] Assignee: AT&T, Middletown, N.J.

[21] Appl. No.: 330,418

[22] Filed: Oct. 28, 1994

[51] Int. Cl.$^6$ .................................................. H04M 1/66
[52] U.S. Cl. ........................... 379/196; 379/189; 379/210; 379/211; 379/243
[58] Field of Search ..................................... 379/188, 189, 379/190, 191, 192, 193, 194, 195, 196, 197, 198, 210, 211, 212, 207, 243, 249

[56] References Cited

U.S. PATENT DOCUMENTS

| | | | |
|---|---|---|---|
| 3,626,109 | 12/1971 | Bartlett et al. | 379/211 |
| 4,001,513 | 1/1977 | Naylor | 379/189 |
| 4,284,851 | 8/1981 | Schweitzer et al. | 379/189 |
| 5,357,564 | 10/1994 | Gupta et al. | 379/207 |
| 5,367,566 | 11/1994 | Moe et al. | 379/207 |
| 5,392,335 | 2/1995 | Reeder | 379/189 |
| 5,392,342 | 2/1995 | Rosenthal | 379/207 |

FOREIGN PATENT DOCUMENTS 04301955  10/1992  Japan .

OTHER PUBLICATIONS

Correction Communications Quarterly, Oct. 1993, pp. 36–47, "Quarterly Reference Guide".

Primary Examiner—Thomas W. Brown
Assistant Examiner—Daniel S. Hunter
Attorney, Agent, or Firm—Mark K. Young

[57] ABSTRACT

Increased network security is provided in accordance with the invention by using information obtained from the signaling network to determine whether a call has been forwarded, and then using this information to make a determination as to appropriate further call processing, to minimize a communications company's exposure to call forwarding fraud. A determination of whether a call is a forwarded call can be made on the basis of a call forwarding indicator provided by another portion of the communications network. Where such an indicator is unavailable, a determination of whether a call is a forwarded call can be made by comparing the telephone number dialed to originate the call with the telephone number (the "connect number") associated with the telephone station to which the call has been forwarded. When the dialed number and the connect number differ, the call is determined to be a forwarded call.

8 Claims, 3 Drawing Sheets

METHOD FOR PROCESSING FORWARDED TELEPHONE CALLS

TECHNICAL FIELD

This invention relates to methods for processing telephone calls which have been forwarded from one telephone station to another and, more particularly, to processing forwarded telephone calls to minimize telephone fraud.

BACKGROUND OF THE INVENTION

Call forwarding is a telephone feature which allows a customer to direct a communications network to re-route telephone calls from one location to another location. Specifically, calls placed to a dialed number are re-routed to a telephone station identified by a different telephone number specified by the customer when setting up the call forwarding feature. Call forwarding, however, is susceptible to various telecommunications fraud schemes. In particular, persons attempting to defraud the telephone company (referred to hereafter as "hackers") subscribe, either legitimately or fraudulently, to telephone service with call forwarding as a service feature. The hackers then arrange to place calls to telephone numbers, using the call forwarding feature, which would otherwise be blocked by the network.

Current methods for protecting and preventing unauthorized use of the communications network have not adequately addressed the problem. For example, methods which detect fraud based on data obtained at the end of one or more billing cycles do not provide sufficiently timely information. By the time the information becomes available to indicate fraud, large amounts of fraudulent usage could already have occurred. Operator assisted calls involve further difficulties in detecting and blocking fraud because anti-fraud protections may be bypassed.

SUMMARY OF THE INVENTION

Increased network security is provided in accordance with the invention by using information obtained from the signaling network to determine whether a call has been forwarded, and then using this information to make a determination as to appropriate further call processing, to minimize a communications company's exposure to call forwarding fraud. A determination of whether a call is a forwarded call can be made on the basis of a call forwarding indicator provided by another portion of the communications network. Where such an indicator is unavailable, a determination of whether a call is a forwarded call can be made by comparing the telephone number dialed to originate the call with the telephone number (the "connect number") associated with the telephone station to which the call has been forwarded. When the dialed number and the connect number differ, the call is determined to be a forwarded call.

In an exemplary embodiment of the invention, the connect number is compared with the dialed number and, where the two numbers differ, either the call is terminated or preselected preventative action is initiated within the network. This embodiment is useful, for example, in the context of processing telephone calls dialed from a prison. In another embodiment of the invention, the connect number is subjected to the same fraud screening process that is applied to the dialed number. For example, if the dialed number is subject to geographical dialing restrictions, such as being limited to calls within the United States, the connect number also must be a number within the United States or the call is terminated.

DETAILED DESCRIPTION

Before describing the novel aspects of the invention, it will be useful to describe the path through an illustrative communications network of a typical forwarded call. Interexchange calls (e.g., inter-lata and international calls) can be forwarded in at least two different ways. First, the call can be routed through the interexchange carrier (IXC) and then forwarded by a local exchange carrier (LEC) switch. Such a call is referred to herein as an "outbound" forwarded call. Alternatively, the call can be forwarded by a LEC switch and then routed through the IXC. Such a call is referred to herein as an "inbound" forwarded call. A different signaling operation takes place depending on whether the call is an outbound or inbound forwarded call. Each type of call will be discussed below.

Figure 1:
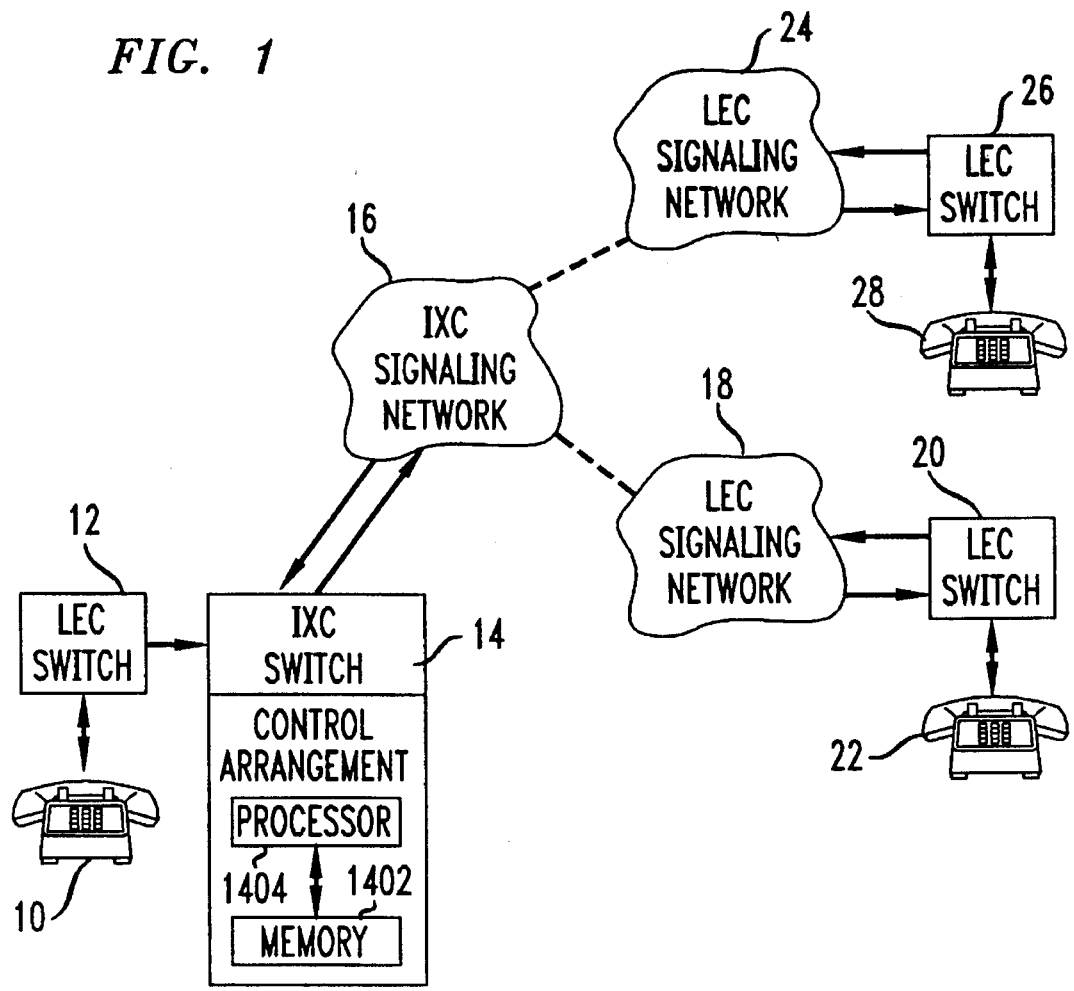
FIG. 1 is a simplified block diagram of a portion of a telecommunications network, including signaling network components, suitable for processing outbound forwarded calls in accordance with the present invention.

Referring now to the drawings, FIG. 1 can be used to illustrate the signaling which occurs to set up an outbound forwarded call. FIG. 1 shows a portion—particularly the signaling portion—of an exemplary communications network at telephone station 22 subscribes to a call forwarding service and has arranged. The network includes telephone stations 10, 22, and 28, LEC switches 12, 20, and 26, IXC switch 14, IXC signaling network 16, and LEC signaling networks 18 and 24. It is assumed that a calling party at a telephone station 10 desires to place a call to a party at a telephone station 22, and that the party to have all calls forwarded to telephone station 28. LEC switches 12, 20, and 26 may be, for example, a 5ESS® switch, which is commercially available from AT&T Corp. IXC switch 14 may be, for example, a 5ESS® switch or a 4ESS™ switch (also commercially available from AT&T Corp.).

LEC switches 12 and 26 communicate with the other switches in the call path by exchanging call handling messages via a data network called a Common Channel Signaling (CCS) network. The CCS network, shown in part in FIG. 1 as IXC signaling network 16, is a packet switching network having a plurality of interconnected nodes called Signal Transfer Points (STPs) that are used to exchange call handling messages between switches according to a specific protocol, such as CCS7. However, for the sake of simplicity, the constituent elements of the signaling network are not expressly shown. The features and functionality of an STP are described in the book *Engineering and Operations in the Bell System, Second Edition,* AT&T Bell Laboratories, 1992, pp. 292–294.

The invention will be described herein in the context of messages using the ISDN User Part (ISUP) protocol. ISUP is an interoffice protocol for circuit-related functions that interworks with Q.931 signaling. ISUP supports calls between ISDN subscriber for basic bearer services and supplementary services (such as Call Forward Busy (CFB), Call Forward No Reply (CFNR), and Call Forward Unconditional (CFU)) for voice and non-voice applications in an ISDN. However, ISUP also supports calls between non-ISDN subscribers. The ISUP message is generated and interpreted by the switches of the CCS network and is carried as the user data in the MTP or SCCP message. LEC switches 12 and 26 communicate with telephone stations 10 and 28, respectively, using a conventional signaling arrangement for the control of circuit-switched calls, illustratively Q.931 signaling. ISUP, with the use of the CCS network, extends Q.931 (which is a point-to-point network access protocol) over a store-and-forward message switching network. While the invention is discussed in the context of CCS7, ISUP, and Q.931 signaling, one skilled in the art will readily appreciate that the principles of the invention are not limited by the type of network signaling used, but rather are applicable to any switching system in which the dialed number, connect number, and call forward indicators can be captured when a call, or a leg of a call, is being set up.

Figure 2:
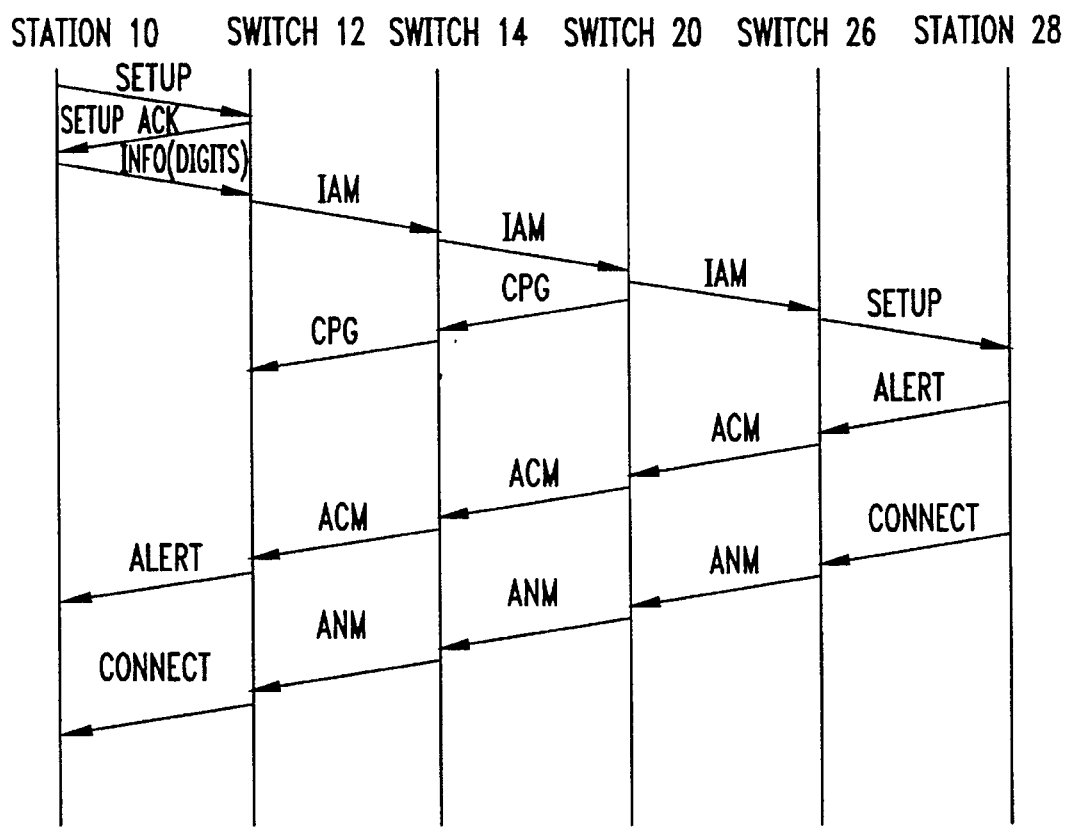
FIG. 2 is an illustrative message sequence diagram for setting up an outbound forwarded call.

FIG. 2 shows exemplary signaling used to set up an outbound forwarded call. When a call is initiated from telephone station 10 to telephone station 22, switch 12 collects dialed digits from telephone station 10 using well known stimulus signaling methods. Telephone station 10 sends a SETUP message (using Q.931 signaling) to switch 12. Switch 12 then returns a SETUP ACK message to station 10. The caller at station 10 then enters the destination directory number (dialed number) and station 10 transmits a sequence of info messages each including one or more digits of the dialed number. (Alternatively, all of the dialed number digits may be included in the setup message.) The SETUP message also includes calling party identification information, such as the originating telephone number, or automatic number identifier (ANI). Switch 12 uses the received dialed number to generate and transmit an ISUP Initial Address Message ("IAM") to switch 14. Switch 14, in turn, transmits an IAM message via signaling networks 16 and 18 to LEC switch 20. LEC switch 20 recognizes that telephone station 22 has activated the call forwarding feature. Rather than setting up the call with telephone station 22, LEC switch 20 transmits an IAM message to LEC switch 26 via signaling networks 18, 16, and 24 to effect the call forwarding service. At the same time, LEC switch 20 transmits an ISUP Call Progress Group ("CPG") message to IXC switch 14 to notify the switch that the call has been forwarded. LEC switch 26 transmits a SETUP message to telephone station 28 to set up the call.

At this point, call processing continues in a conventional manner by transfer of signaling messages between telephone station 28 and telephone station 10. Station 28 sends an ALERT message to switch 26. Switch 26 transmits an Address Complete Message (ACM) via switches 20 and 14 to switch 12. Switch 12 then sends an ALERT message to station 10. Telephone station 28 then sends a Connect message to switch 26. Switch 26 sends an Answer Message (ANM) call supervision message via switches 20 and 14 to switch 12. Switch 12 then sends a Connect message to telephone station 10.

Figure 3:
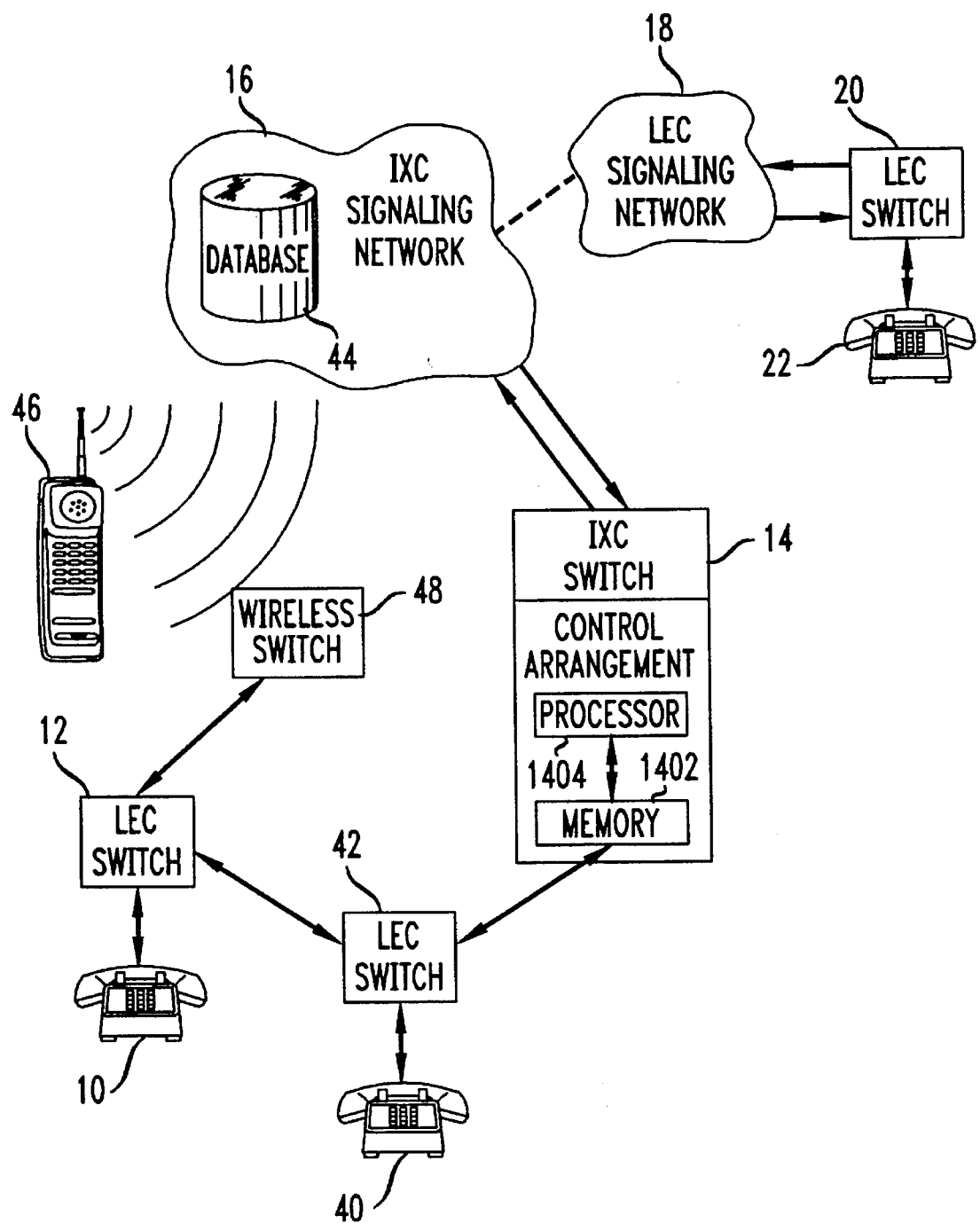
FIG. 3 is a simplified block diagram of a portion of a telecommunications network, including signaling network components, suitable for processing inbound forwarded calls in accordance with the present invention.

FIG. 3 shows a network for switching an inbound forwarded call. In addition to various elements common to those shown in FIG. 1, the network of FIG. 3 includes a telephone station 40, a LEC switch 42, and a database 44 that is disposed within signaling network 16. (FIG. 3 also includes a mobile telephone station 46 and a wireless switch 48, which will be described later.) In this example, call forwarding is effected before the call reaches the IXC network. In particular, a caller at telephone station 10 places a call to telephone station 40. Telephone station 40 is arranged to forward calls to telephone station 22. Telephone station 22 is located in a different area code or country than telephone stations 10 and 40.

One skilled in the art will appreciate that the signaling messaging for establishing an inbound forwarded call is similar in nature to the messaging for outbound forwarded calls shown in FIG. 2. When a call is initiated from telephone station 10 to telephone station 40, telephone station 10 sends a Setup message to switch 12, causing the switch to collect dialed digits from telephone station 10. Switch 12 then transmits an IAM message to switch 42. LEC switch 42 recognizes that telephone station 40 has activated the call forwarding feature to forward calls to telephone station 22. Rather than setting up the call with telephone station 40, LEC switch 42 transmits an IAM message to IXC switch 14, which, in turn, transmits an IAM message via signaling networks 16 and 18 to LEC switch 20 to effect the call forwarding service. LEC switch 20 then transmits a Setup message to telephone station 22 to set up the call. At this point, call processing continues in a conventional manner by transfer of signaling messages between telephone station 22 and telephone station 10. In setting up the inbound forwarded call, LEC switch 42 typically will indicate to IXC switch 14 that the call is a forwarded call. This notification may be provided by using a call forwarding indicator, for example, by using ISUP parameters 3.20 or 3.25.

We have recognized that by monitoring the call set up process, information transferred via the signaling network as part of the signaling used to set up the call can be captured and used to detect and prevent telephone fraud effected through the use of the call forwarding service. In particular, information captured is used to determine whether a telephone call has been completed to the dialed number. The dialed number and the connect number are captured by various components of the signaling network at various times during call set up. The dialed number and the connect number are then compared or otherwise analyzed to determine the manner in which the call is to be processed. As discussed below, the manner in which this information is collected may depend upon whether the call is an outbound or inbound forwarded call.

In the case of an outbound forwarded call, as in FIG. 1, the call progress (CPG) message transmitted from LEC switch 20 to IXC switch 14 includes an indication of the telephone number (e.g., the ANI) of the telephone station to which the call was forwarded, together with a call forward indicator. IXC switch 14 captures this information in a memory location 1402 for subsequent processing. Switch 14 also stores the originally dialed number, which it received as part of the IAM message from LEC switch 12. A processor 1404, illustratively disposed within IXC switch 14, communicates with memory location 1402 to process the dialed number, connect number, and call forward indicator in accordance with the invention. In the case of an inbound forwarded call, as in FIG. 3, IXC switch 14 captures the dialed number, connect number, and call forward indicator from signaling messages received from LEC switch 42 and stores the numbers in memory location 1402. It is to be understood that processor 1404 and memory location 1402, or the functionality of these elements, could be disposed within a LEC switch, an operator position, or a signaling network component such as an STP.

Although it would be preferable to capture as much information as possible from the signaling messages to determine whether a forwarded call represents an attempt to defraud the communications carrier, it is to be understood that only part of the information may be available for capture. For example, only a call forward indicator may be available, or only the dialed and connect numbers may be available. One skilled in the art will readily appreciate, in view of this disclosure, that collecting part of the information often will suffice to permit a determination of whether to block, terminate, or otherwise track and process a call suspected of being fraudulent.

Having described how to collect the dialed number, connect number, and call forward indicator for a forwarded call, various ways in which the information can be used to minimized fraud will now be described. There are many different ways in which the dialed number and connect number can be used in this context, a few examples of which are discussed in turn below.

First, the information that a call has been forwarded can be used to determine whether to complete the call. For example, calls for which the dialed number and connect number are different, or for which a call forward indicator is present, simply are terminated. As used herein, "terminating" a call refers to preventing a normal voice path (or data path for facsimile calls and other data transmissions), and includes blocking of the call before the path is established or tearing down the call if the path has already been established. Processor 1404 (FIG. 1) retrieves the dialed number and the connect number (i.e., the "forwarding telephone number") from memory 1402, compares the two numbers, and signals switch 14 to terminate the call when the two numbers are different (or upon another suitable analysis). Similarly, the presence of a call forward indicator can be used by processor 1404 to initiate call termination. This may be achieved, for example, by causing switch 14 to transmit a Release call supervision message to the other switches involved in the call, preferably before LEC switch 12 sends the Connect message to station 10 (see FIG. 2). This type of processing may be appropriate where call forwarding simply is not allowed for the call. One example where such processing would be appropriate is the limited telephone service available to prisoners in the criminal justice system—prisoners are allowed to call only selected telephone numbers. By restricting the use of call forwarding entirely, prisoners are prevented from placing unauthorized calls via the call forwarding mechanism which would have been blocked had the call been directly dialed to that destination. Because calls placed from cellular or other radio-based telephones are subject to high fraud, including fraud committed via call forwarding, it may also be appropriate to terminate all cellular calls connected to a number other than the dialed number.

Information indicating that a call has been forwarded also can be used to subject the forwarded call to the same terminating call restrictions that would have been applied to the dialed number in determining whether to complete the call. In other words, if the connect number does not satisfy the terminating call restrictions applicable to the dialed number, the call is blocked or some further fraud prevention activity is initiated. For example, if a caller at telephone station 10 (FIG. 1) is restricted from directly dialing telephone numbers outside the United States, calls originating at telephone station 10 will not be forwarded to a telephone number corresponding to a destination outside the United States. In this manner, the caller is prevented from using the call forwarding service to "dial around" the terminating call restrictions on the telephone from which a call is placed.

In a further embodiment of the invention, a call for which the dialed number and connect number are routed to an attendant. Processor 1404 retrieves the dialed number and the connect number from memory 1402, compares the two numbers, and routes the call to an attended operator position or other customer service attendant. The attendant may then question the caller to obtain further information demonstrating the caller's right to complete the call. The attendant then determines whether to complete or terminate the call.

In still another embodiment of the invention, forwarded calls are flagged for further investigation or processing. The further processing can take many forms. For example, once the call is identified as a forwarded call, either by call forwarding indicator or a difference between the dialed and connect numbers, processor 1404 can analyze predetermined call attributes and selectively terminate those calls having attributes indicative of fraudulent calls. If, for example, a given call is identified as a forwarded call, and processor 1404 determines that the connect number has a country code outside the United States, processor 1404 may automatically terminate the call.

Forwarded calls flagged for further investigation as described above can be processed according to the call forwarding history of the dialed number. That is, forwarded calls are checked against call detail records stored in a database, such as database 44 of FIG. 3, to determine how often calls to that dialed number have been forwarded within some specified period of time. The database, which may be a network control point (NCP) commercially available from AT&T Corp., would store records having at least the dialed number and an indication of whether the call to the dialed number was forwarded to another number. The records preferably also would include the date and time of the call, the ANI of the originating telephone station, and the connect number. In operation, call processing would proceed as described above until processor 1404 determines that the call is a forwarded call. Upon detecting call forwarding, processor 1404 queries the database 44 with a message which includes the dialed number, a call forward indicator, and preferably the ANI of the originating telephone station, the connect number, and the date and time of the call. The database includes a processor under the control of suitable programming which, in response to the call forwarding indicator, compares the dialed number with the dialed number of the call detail records stored in the database. The processor of database 44 counts the number of occurrences (matches) in which the dialed number in the message received from switch 14 matches a record in the database having a dialed number and a call forwarding indicator. If the number of occurrences exceeds a predetermined threshold (as specified in fraud prevention software installed in the database processor), database 44 returns a message to switch 14 instructing the switch to terminate the call or initiate other fraud prevention activities. The information provided to database 44 in the original message from switch 14 is added as a record to the database 44 as a call detail record. The database can be designed to automatically discard old call detail records on a rolling basis as new call detail records are added. Database 44 may be dedicated to monitoring call forwarding fraud, but preferably is part of another system or has other functions and uses so as to make the system more efficient.

While the invention has been discussed in the context of wired telephone service, the principles of the invention are equally applicable to wireless telephone service, such as calls originating from a cellular telephone. With reference to FIG. 3, assume for the purpose of discussion that a caller at wireless telephone 46 originates a telephone call to telephone station 40, and that telephone station 40 has arranged to forward the call to telephone station 22 outside the United States. The call is switched through wireless switch 48, to LEC switch 12, and then to LEC switch 42. LEC switch 42 forwards the call to telephone station 22. In accordance with the invention, switch 14 detects that the call has not been completed to the dialed number (i.e., to telephone station 40). In response to this determination, switch 14, under the control of processor 1404, takes the appropriate action to minimize the likelihood of call forwarding fraud on the communications service provider. Upon determining that the call is a forwarded call, switch 14 may determine that the call originated from a wireless telephone, for example, by examining the automatic number identifier, or ANI, of the originating telephone station. As discussed above, the indication that the call is a forwarded call, together with the indication that the call originated from a wireless telephone, may be the basis for initiating immediate termination of the call. Switch 14 also may use these indications together with the country code of the connect number as the basis for allowing or terminating the call.

The call forwarding fraud prevention techniques of the invention can be useful where a caller is directly connected to an IXC, such as through an operator position. For example, the principles described herein are applicable to calls billed to a calling card or credit card, and to calls placed (completed) by an attendant on the caller's behalf. In this regard, the principles of the invention can be utilized to provide an attendant with an indication that a given call has been forwarded to the attendant. Such an indication will enable the attendant to recognize the call as a forwarded call and refuse to complete the call.

One skilled in the art will appreciate that various modifications can be made to the network and the call forwarding fraud detection process without departing from the scope of the invention. For example, while the invention has been described in the context of voice and data call, the principles of the invention are equally applicable to multimedia calls, such as video telephone calls. Also, the invention can be used to detect (and terminate) calls that are forwarded multiple times before being completed to a final destination telephone station. In such a case, the dialed number and the connect number will differ, or a call forwarding indicator will be provided, in the same manner as discussed above for a call that is forwarded once.

We claim:

1. A call processing method comprising the steps of:

capturing a telephone number dialed to originate a call to a predetermined destination;

capturing a second telephone number associated with the telephone station to which the call will ultimately be connected;

comparing the dialed telephone number with the second telephone number;

responsive to a determination that the first and second telephone numbers are the same, further extending the call toward the destination; and responsive to a determination that the dialed telephone number and the second telephone number differ, terminating the call.

2. A call processing method comprising the steps of:

determining whether a call to a communication station is a forwarded call;

responsive to a determination that the call is a forwarded call, preventing completion of the call to the communication station; and wherein the step of determining whether the call is a forwarded call comprises the steps of:

capturing a telephone number dialed to originate the call to a predetermined destination;

capturing a second telephone number associated with the telephone station to which the call will ultimately be connected; and comparing the dialed number with the second telephone number to determine that the call is a forwarded call when the dialed and second telephone numbers differ.

3. A call processing method comprising the steps of:

determining whether a call to a communication station is a forwarded call;

responsive to a determination that the call is a forwarded call, determining whether a telephone number dialed to originate the call is subject to a call restriction;

testing a second telephone number, associated with the telephone station to which the call will ultimately be connected, against the call restriction; and responsive to a determination that the second telephone number does not meet the call restriction, initiating fraud prevention activity in connection with processing the call.

4. The method of claim 3 wherein the determining step comprises comparing dialed telephone number with the second telephone number to determine whether the call is a forwarded call.

5. The method of claim 3 wherein the fraud prevention activity in connection with processing the call comprises terminating the call.

6. A call processing method comprising the steps of:

determining whether a call to a communication station is a forwarded call;

responsive to a determination that the call is a forwarded call, accessing a database to obtain information indicative of whether the call represents unauthorized use of the communications network.

7. A method of processing a telephone call, comprising the steps of:

determining whether the call is to be completed to a telephone number dialed to originate the call;

responsive to a determination that the call will not be completed to the dialed number, initiating fraud prevention activity in connection with processing the call; and wherein the step of initiating fraud prevention activity comprises the steps of:

determining whether the dialed telephone number is subject to a call restriction;

testing a second telephone number associated with the telephone station to which the call will ultimately be connected against the call restriction; and terminating the call if the second telephone number does not meet the call restriction.

8. A method of processing a telephone call, comprising the steps of:

determining whether the call is to be completed to a telephone number dialed to originate the call;

responsive to a determination that the call will not be completed to the dialed number, initiating fraud prevention activity in connection with processing the call; and wherein the step of initiating fraud prevention activity comprises accessing a database to obtain information indicative of whether the call represents unauthorized use of the communications network.

* * * * *